US012585906B2

(12) United States Patent
Nakatsuji et al.

(10) Patent No.: US 12,585,906 B2
(45) Date of Patent: Mar. 24, 2026

(54) IMAGE FORMING APPARATUS

(71) Applicant: KYOCERA Document Solutions Inc., Osaka (JP)

(72) Inventors: Hiroomi Nakatsuji, Osaka (JP); Jun Nakano, Osaka (JP); Masato Usui, Osaka (JP); Naoko Kawashima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 288 days.

(21) Appl. No.: 18/590,883

(22) Filed: Feb. 28, 2024

(65) Prior Publication Data

US 2024/0311599 A1 Sep. 19, 2024

(30) Foreign Application Priority Data

Mar. 13, 2023 (JP) ................................ 2023-038857

(51) Int. Cl.
*G06K 15/02* (2006.01)
*B41J 2/21* (2006.01)

(52) U.S. Cl.
CPC ........ *G06K 15/1878* (2013.01); *B41J 2/2132* (2013.01); *G06K 15/1822* (2013.01); *G06K 2215/101* (2013.01)

(58) Field of Classification Search
CPC ........... G06K 15/1878; G06K 15/1822; G06K 2215/101; B41J 2/2132
See application file for complete search history.

(56) References Cited

U.S. PATENT DOCUMENTS

2011/0157605 A1* 6/2011 Pepin ...................... H04N 1/58 358/3.26

FOREIGN PATENT DOCUMENTS

| | | |
|---|---|---|
| JP | 2017-105073 | 6/2007 |
| JP | 2014-144608 | 8/2014 |

* cited by examiner

*Primary Examiner* — Christopher Wait

(57) ABSTRACT

A black-generation-and-UCR processing unit generates image data of a black ink color from image data of chromatic ink colors of the image and adjusts values of the image data of the chromatic ink colors correspondingly to generation of the image data of the black ink color. An image outputting unit causes a printing device to perform printing based on the image data. A print condition adjustment unit derives an ink coverage of the image on a print sheet, determines a black generation ratio corresponding to the ink coverage, and causes the black-generation-and-UCR processing unit to perform generation of the image data of the black ink color with the determined black generation ratio. The ink coverage indicates a ratio of ink usage amounts of the chromatic ink colors and the black ink color to a predetermined maximum value, for a pixel for which ink is ejected in the image.

5 Claims, 6 Drawing Sheets

FIG. 2

| INK COVERAGE | PRINT CONDITION ADJUSTMENT | | |
|---|---|---|---|
| | ZOOMING | PRINT TIMING | BLACK GENERATION AMOUNT |
| LESS THAN 50% | NO ADJUSTMENT | NO ADJUSTMENT | NO ADJUSTMENT |
| EQUAL TO/ LARGER THAN 50% | 100.1% ENLARGEMENT | ADVANCING BY 0.05 SECOND | INCREASING |

FIG. 3

| PRINT SHEET TYPE | PRINT CONDITION ADJUSTMENT | | |
|---|---|---|---|
| | ZOOMING | PRINT TIMING | BLACK GENERATION AMOUNT |
| PLAIN PAPER | NO ADJUSTMENT | NO ADJUSTMENT | NO ADJUSTMENT |
| COATED PAPER | 100.05% ENLARGEMENT | ADVANCING BY 0.05 SECOND | NO ADJUSTMENT |
| PHOTO PAPER | 100.1% ENLARGEMENT | REFERENCE VALUE | NO ADJUSTMENT |

FIG. 4

| PRINT MODE | PRINT CONDITION ADJUSTMENT | | |
|---|---|---|---|
| | ZOOMING | PRINT TIMING | BLACK GENERATION AMOUNT |
| SIMPLEX | NO ADJUSTMENT | NO ADJUSTMENT | NO ADJUSTMENT |
| 1ST SURFACE OF DUPLEX | 100.1% ENLARGEMENT | ADVANCING BY 0.05 SECOND | NO ADJUSTMENT |
| 2ND SURFACE OF DUPLEX | 100.05% ENLARGEMENT | ADVANCING BY 0.05 SECOND | NO ADJUSTMENT |

FIG. 5

| PRINTING COVERAGE | PRINT CONDITION ADJUSTMENT | | |
|---|---|---|---|
| | ZOOMING | PRINT TIMING | BLACK GENERATION AMOUNT |
| LESS THAN 10% | NO ADJUSTMENT | NO ADJUSTMENT | NO ADJUSTMENT |
| EQUAL TO/LARGER THAN 10% AND LESS THAN 50% | 100.05% ENLARGEMENT | NO ADJUSTMENT | NO ADJUSTMENT |
| EQUAL TO/LARGER THAN 50% | 100.1% ENLARGEMENT | NO ADJUSTMENT | NO ADJUSTMENT |

IMAGE FORMING APPARATUS

CROSS-REFERENCE TO RELATED APPLICATIONS

This application relates to and claims priority rights from Japanese Patent Application No. 2023-038857, filed on Mar. 13, 2023, the entire disclosures of which are hereby incorporated by reference herein.

BACKGROUND

1. Field of the Present Disclosure

The present disclosure relates to an image forming apparatus.

2. Description of the Related Art

A printing apparatus performs front-to-back registration for duplex printing in consideration of expansion and contraction of a print sheet due to drying.

An image forming apparatus performs zooming of an image to be printed, in consideration of expansion and contraction of a print sheet due to drying, correspondingly to a coverage rate pattern of the image. Here, the coverage rate pattern is a pattern of coverage rates of plural area obtained by dividing a printable area.

As mentioned, in inkjet printing, adjustment of a printing position or zooming of an image are performed in consideration of expansion and contraction of a print sheet due to drying, but expansion and contraction of a print sheet still occur and influence of expansion and contraction of a print sheet is not sufficiently restrained.

SUMMARY

An image forming apparatus according to an aspect of the present disclosure includes an inkjet printing device, a black-generation-and-UCR processing unit, an image outputting unit, and a print condition adjustment unit. The inkjet printing device is configured to eject ink to a print sheet and thereby print an image. The black-generation-and-UCR processing unit is configured to generate image data of a black ink color from image data of chromatic ink colors of the image and adjust values of the image data of the chromatic ink colors correspondingly to generation of the image data of the black ink color. The image outputting unit is configured to cause the printing device to perform printing based on the image data of the black ink color generated and the image data of the chromatic ink colors adjusted by the black-generation-and-UCR processing unit. The print condition adjustment unit is configured to (a) derive an ink coverage of the image on the print sheet, (b) determine a black generation ratio corresponding to the ink coverage, and (c) cause the black-generation-and-UCR processing unit to perform generation of the image data of the black ink color with the determined black generation ratio. Here, the ink coverage indicates a ratio of ink usage amounts of the chromatic ink colors and the black ink color to a predetermined maximum value, for a pixel for which ink is ejected in the image.

These and other objects, features and advantages of the present disclosure will become more apparent upon reading of the following detailed description along with the accompanied drawings.

BRIEF DESCRIPTION OF THE DRAWINGS

FIG. 2 shows a diagram that indicates an example of print condition adjustment corresponding to an ink coverage in the image forming apparatus shown in FIG. 1;

FIG. 3 shows a diagram that indicates an example of print condition adjustment corresponding to a print sheet type in the image forming apparatus shown in FIG. 1;

FIG. 4 shows a diagram that indicates an example of print condition adjustment corresponding to a print mode in the image forming apparatus shown in FIG. 1;

FIG. 5 shows a diagram that indicates an example of print condition adjustment corresponding to a printing coverage in the image forming apparatus shown in FIG. 1.

DETAILED DESCRIPTION

Hereinafter, an embodiment according to an aspect of the present disclosure will be explained with reference to drawings.

Figure 1:
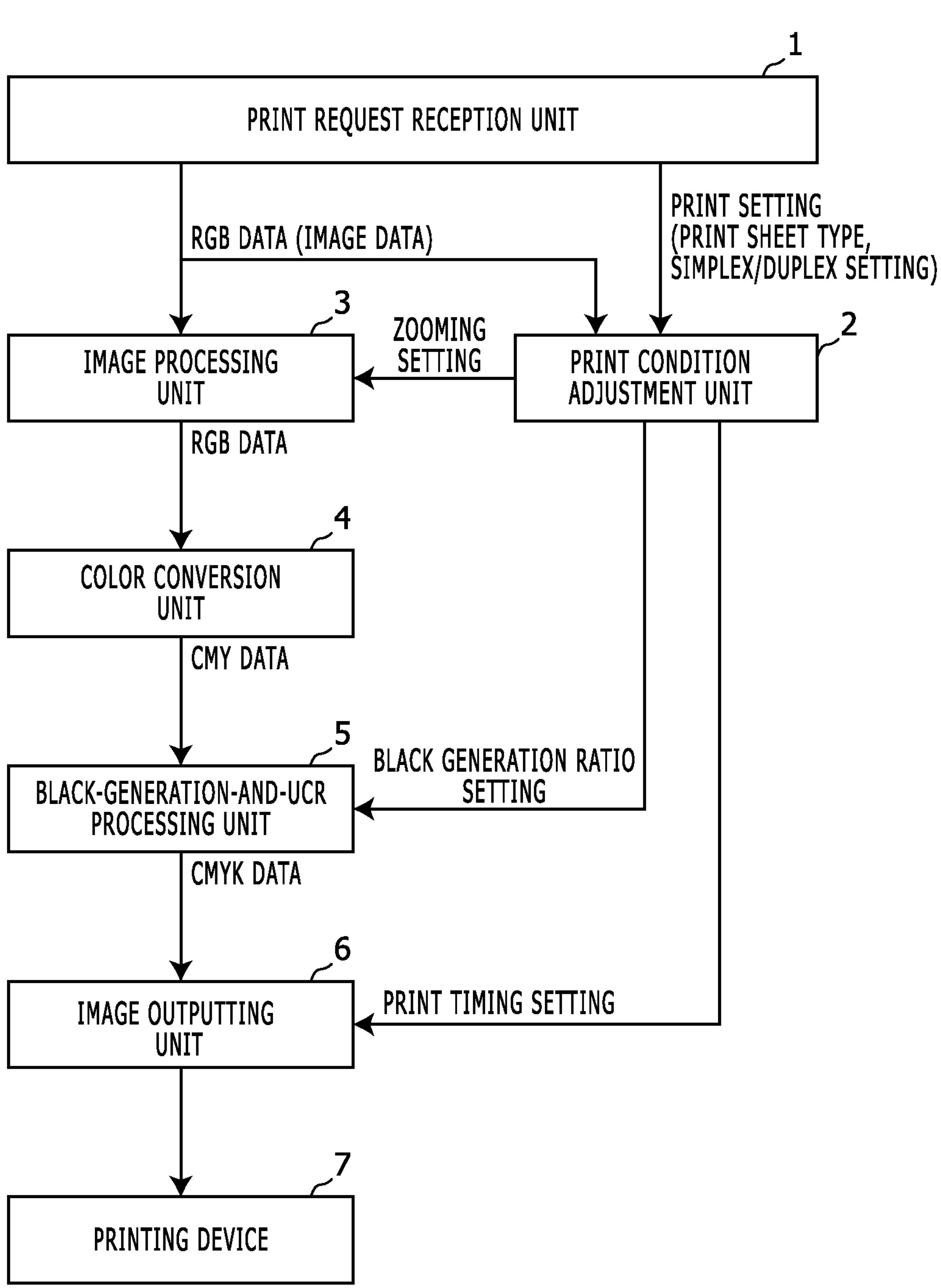
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. An image forming apparatus shown in FIG. 1 is a printer, a multi function peripheral or the like, for example, and includes a print request reception unit 1, a print condition adjustment unit 2, an image processing unit 3, a color conversion unit 4, a black-generation-and-UCR processing unit 5, an image outputting unit 6, and a printing device 7. The printing device 7 is an inkjet printing device that ejects ink to a print sheet and thereby prints an image.

The print request reception unit 1 receives a print request from a user, and on the basis of the print request, determines a print setting and acquires image data (RGB data) of an image to be printed. For example, this image data is image data of a document image optically scanned from a document using a scanner unit (not shown), image data received with the aforementioned print request from a host device using a communication device (not shown) or the like.

The print condition adjustment unit 2 (a) derives an ink coverage of the image on a print sheet on the basis of image data of an image to be printed, (b) determines a black generation ratio corresponding to the ink coverage, and (c) causes the black-generation-and-UCR processing unit 5 to perform generation of the image data of the black ink color with the determined black generation ratio. Here, the ink coverage indicates a ratio of ink usage amounts of the chromatic ink colors and the black ink color to a predetermined maximum value, for a pixel for which ink is ejected in the aforementioned image.

Here, for example, the image to be printed is converted from RGB data to CMY data, ink usage amounts of chromatic ink (CMY ink) and black ink (K ink) are determined in case that black generation and under color removal are performed with a black generation ratio of a default value on the basis of the CMY data. Here, the CMY data is image data in a color space of three chromatic colors Cyan, Magenta, and Yellow that are ink colors of ink used in the printing device 7.

For example, the higher the ink coverage, the higher black generation ratio the print condition adjustment unit 2 sets.

FIG. 2 shows a diagram that indicates an example of print condition adjustment corresponding to an ink coverage in the image forming apparatus shown in FIG. 1. Here, as shown in FIG. 2, for example, if the ink coverage is equal to or larger than a predetermined threshold value (e.g. 50 percent), the print condition adjustment unit 2 increases the black generation ratio from the default value to a predetermined value, and if the ink coverage is less than the predetermined threshold value, the print condition adjustment unit 2 keeps the black generation ratio as the default value and does not increase the black generation ratio. If the black generation ratio is increased, a total of the ink usage amounts of the chromatic ink (CMY ink) and the black ink (K ink) decreases, and thereby expansion and contraction of a print sheet due to ink absorption are reduced.

Further, in this embodiment, the print condition adjustment unit 2 determines a zooming ratio and a print timing adjustment amount that correspond to the ink coverage, as shown in FIG. 2, causes the image processing unit 3 to perform zooming of the image with the determined zooming ratio, and causes the image outputting unit 6 to control the printing device 7 so as to shift print timing by the determined print timing adjustment amount.

FIG. 3 shows a diagram that indicates an example of print condition adjustment corresponding to a print sheet type in the image forming apparatus shown in FIG. 1. FIG. 4 shows a diagram that indicates an example of print condition adjustment corresponding to a print mode in the image forming apparatus shown in FIG. 1. Further, in this embodiment, as shown in FIGS. 3 and 4, for example, the print condition adjustment unit 2 adjusts the zooming ratio and the print timing adjustment amount in accordance with the print setting (print sheet type, print mode setting (simplex printing/duplex printing) and/or the like) specified by the print request. For duplex printing to first and second surfaces of the print sheet, the print condition adjustment unit 2 sets the zooming ratio of the second surface such that the zooming ratio of the second surface is larger than the zooming ratio of the first surface.

FIG. 5 shows a diagram that indicates an example of print condition adjustment corresponding to a printing coverage in the image forming apparatus shown in FIG. 1. Further, in this embodiment, as shown in FIG. 5, for example, the print condition adjustment unit 2 determines a printing coverage (a ratio of pixels on which a dot is formed to all pixels) of an image to be printed on the basis of image data of the image to be printed, and adjusts the zooming ratio and the print timing adjustment amount in accordance with the printing coverage.

Returning to FIG. 1, the image processing unit 3 performs an image process such as filter process and/or zooming process (enlarging/shrinking of an image) for the aforementioned image data of the image to be printed.

The color conversion unit 4 performs conversion of a color space of the aforementioned image data of the image to be printed, and here, converts the aforementioned image data of the image to be printed from RGB data to CMY data.

The black-generation-and-UCR processing unit 5 generates image data of a black ink color (here, K data) from image data of chromatic ink colors of the aforementioned image to be printed (here, CMY data) with a black generation ratio specified by the print condition adjustment unit 2, and as Under Color Removal (UCR) process, adjusts values of the image data of the chromatic ink colors correspondingly to generation of the image data of the black ink color.

The image outputting unit 6 causes the printing device 7 to perform printing based on the image data of the black ink color generated and the image data of the chromatic ink colors adjusted by the black-generation-and-UCR processing unit 5.

The print request reception unit 1, the print condition adjustment unit 2, the image processing unit 3, the color conversion unit 4, the black-generation-and-UCR processing unit 5, and the image outputting unit 6 mentioned above are formed by executing a program using a computer that includes a CPU (Central Processing Unit), a ROM (Read Only Memory), a RAM (Random Access Memory) and the like or by an ASIC (Application Specific Integrated Circuit).

Figure 6:
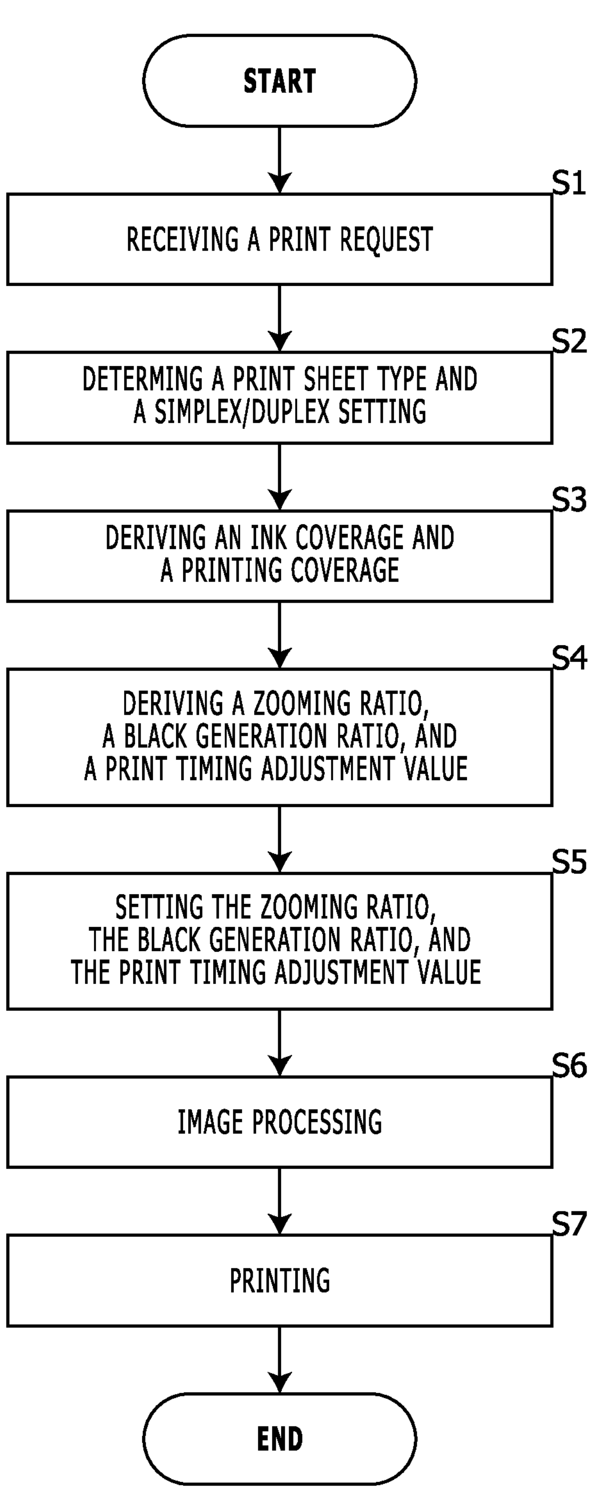
FIG. 6 shows a flowchart that explains a behavior of the image forming apparatus shown in FIG. 1.

The following part explains a behavior of the aforementioned image forming apparatus. FIG. 6 shows a flowchart explains a behavior of the image forming apparatus shown in FIG. 1.

The print request reception unit 1 receives a print request (in Step S1), and upon receiving the print request, the print condition adjustment unit 2 determines a print setting (print sheet type and simplex/duplex setting) specified by the print request (in Step S2).

Further, the print condition adjustment unit 2 derives the ink coverage and the printing coverage mentioned above on the basis of image data of an image specified by the print request (in Step S3).

Subsequently, as mentioned, the print condition adjustment unit 2 derives a zooming ratio, a black generation ratio, and a print timing adjustment value in accordance with the determined print sheet type, simplex/duplex setting, ink coverage, and printing coverage (in Step S4), and sets the zooming ratio to the image processing unit 3, sets the black generation ratio to the black-generation-and-UCR processing unit 5, and sets the print timing adjustment value to the image outputting unit 6 (in Step S5).

Afterward, the image processing unit 3 zooms the image specified by the print setting with this zooming ratio, the color conversion unit 4 converts the zoomed image to CMY data, and the black-generation-and-UCR processing unit 5 performs the black-generation-and-UCR process for the CMY data and thereby generates CMYK data (in Step S6). Subsequently, on the basis of the CMYK data, the image outputting unit 6 controls printing device 7 and thereby performs printing of the specified image (in Step S7). Here, the image outputting unit 6 performs printing of the image at a print timing shifted by the set print timing adjustment value. Consequently, an image printed on a print sheet is shifted by a distance corresponding to the print timing adjustment value in a secondary scanning direction (transportation direction of the print sheet).

As mentioned, in the aforementioned embodiment, the print condition adjustment unit 2 (a) derives an ink coverage of a print target image on a print sheet, (b) determines a black generation ratio corresponding to the ink coverage, and (c) causes the black-generation-and-UCR processing unit 5 to perform generation of the image data of the black ink color with the determined black generation ratio. Here, the ink coverage indicates a ratio of ink usage amounts of chromatic ink colors and the black ink color to a predetermined maximum value, for a pixel for which ink is ejected in the image.

Consequently, ink ejection amounts are reduced due to the black generation and the under color removal, and therefore, while deterioration of image quality is restrained, expansion and contraction of the print sheet due to drying is restrained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:

an inkjet printing device configured to eject ink to a print sheet and thereby print an image;

a black-generation-and-UCR processing unit configured to generate image data of a black ink color from image data of chromatic ink colors of the image and adjust values of the image data of the chromatic ink colors correspondingly to generation of the image data of the black ink color;

an image outputting unit configured to cause the printing device to perform printing based on the image data of the black ink color generated and the image data of the chromatic ink colors adjusted by the black-generation-and-UCR processing unit; and a print condition adjustment unit configured to (a) derive an ink coverage of the image on the print sheet, (b) determine a black generation ratio corresponding to the ink coverage, and (c) cause the black-generation-and-UCR processing unit to perform generation of the image data of the black ink color with the determined black generation ratio;

wherein the ink coverage indicates a ratio of ink usage amounts of the chromatic ink colors and the black ink color to a predetermined maximum value, for a pixel for which ink is ejected in the image.

2. The image forming apparatus according to claim 1, wherein the higher the ink coverage, the higher black generation ratio the print condition adjustment unit sets.

3. The image forming apparatus according to claim 1, wherein if the ink coverage is equal to or larger than a predetermined threshold value, the print condition adjustment unit increases the black generation ratio, and if the ink coverage is less than the predetermined threshold value, the print condition adjustment unit does not increase the black generation ratio.

4. The image forming apparatus according to claim 1, further comprising an image processing unit configured to be enabled to perform a predetermined image process for the image;

wherein the print condition adjustment unit determines a zooming ratio and a print timing adjustment amount that correspond to the ink coverage, causes the image processing unit to perform zooming of the image with the determined zooming ratio, and causes the image outputting unit to control the printing device so as to shift print timing by the determined print timing adjustment amount.

5. The image forming apparatus according to claim 4, wherein for duplex printing to first and second surfaces of the print sheet, the print condition adjustment unit sets the zooming ratio of the second surface such that the zooming ratio of the second surface is larger than the zooming ratio of the first surface.

* * * * *